US006967966B1

(12) United States Patent
Donohue

(10) Patent No.: US 6,967,966 B1
(45) Date of Patent: Nov. 22, 2005

(54) DIGITAL RETURN PATH FOR HYBRID FIBER/COAX NETWORK

(75) Inventor: John E. Donohue, Ridgefield, CT (US)

(73) Assignee: ADC Telecommunications, Inc., Minnetonka, MN (US)

( * ) Notice: Subject to any disclaimer, the term of this patent is extended or adjusted under 35 U.S.C. 154(b) by 639 days.

(21) Appl. No.: 09/433,332

(22) Filed: Nov. 3, 1999

(51) Int. Cl.[7] .......................................... H04L 12/413
(52) U.S. Cl. ..................................... 370/445; 370/481
(58) Field of Search ............................... 370/465, 480, 370/481, 235, 438, 445; 725/104; 714/746; 348/14.01

(56) References Cited

U.S. PATENT DOCUMENTS

| 3,931,473 A | | 1/1976 | Ferris, Jr. | |
|---|---|---|---|---|
| 4,101,834 A | * | 7/1978 | Stutt et al. | 370/482 |
| 4,244,046 A | | 1/1981 | Brouard et al. | |
| 4,354,167 A | | 10/1982 | Terreault et al. | |
| 4,531,239 A | * | 7/1985 | Usui | 359/136 |
| 4,701,909 A | * | 10/1987 | Kavehrad et al. | 370/446 |
| 4,754,451 A | * | 6/1988 | Eng et al. | 370/417 |
| 4,816,825 A | * | 3/1989 | Chan et al. | 340/825.5 |
| 4,920,533 A | | 4/1990 | Dufresne et al. | |
| 4,959,829 A | * | 9/1990 | Griesing | 370/438 |
| 5,136,410 A | | 8/1992 | Heiling et al. | |
| 5,138,440 A | | 8/1992 | Radice | |
| 5,198,989 A | | 3/1993 | Petroff | |
| 5,272,700 A | * | 12/1993 | Hansen et al. | 370/480 |
| 5,341,216 A | | 8/1994 | Hoffart | |
| 5,442,700 A | | 8/1995 | Snell | |
| 5,469,495 A | * | 11/1995 | Beveridge | 370/445 |
| 5,469,545 A | * | 11/1995 | Vanbuskirk et al. | 370/235 |
| 5,557,319 A | | 9/1996 | Gurusami et al. | 348/11 |
| 5,587,734 A | | 12/1996 | Lauder et al. | |
| 5,621,786 A | | 4/1997 | Fischer et al. | |
| 5,630,204 A | | 5/1997 | Hylton et al. | |
| 5,680,130 A | | 10/1997 | Tsutsui et al. | |
| 5,765,097 A | | 6/1998 | Dail | |
| 5,765,099 A | | 6/1998 | Georges et al. | |
| 5,768,682 A | * | 6/1998 | Peyrovian | 348/14.01 |
| 5,774,789 A | | 6/1998 | Van der Kaay et al. | |
| 5,777,544 A | | 7/1998 | Vander Mey et al. | |
| 5,838,989 A | * | 11/1998 | Hutchison et al. | 725/104 |

(Continued)

FOREIGN PATENT DOCUMENTS

EP       0 664 621       7/1994

(Continued)

OTHER PUBLICATIONS

Akos et al., Jul. 1999, *IEEE Transactions on Communications*, 47:983-988, "Direct Bandpass Sampling of Multiple Distinct RF Signals".

(Continued)

*Primary Examiner*—Huy D. Vu
*Assistant Examiner*—Daniel J. Ryman
(74) *Attorney, Agent, or Firm*—Fogg and Associates, LLC

(57) ABSTRACT

An optical distribution node for an hybrid fiber/coax network is provided. The optical distribution node includes a laser transmitter coupleable to a fiber optic link that transmits upstream, digital data to a head end of the network. The node also includes a data concentrator coupled to provide the upstream, digital data to the laser. For at least one coaxial cable link of the network coupleable to the optical distribution node, the node also includes a frequency translator that receives the upstream, digital data modulated on a first carrier frequency and retransmits the upstream, digital data to the plurality of modems for collision detection. The node also includes a data interface coupled between the at least one coaxial cable link and the data concentrator that determines whether the upstream data is valid.

29 Claims, 2 Drawing Sheets

U.S. PATENT DOCUMENTS

| | | | |
|---|---|---|---|
| 5,859,895 A | 1/1999 | Pomp et al. | |
| 5,864,748 A | 1/1999 | Dail | |
| 5,872,810 A | 2/1999 | Philips et al. | |
| 5,878,325 A | 3/1999 | Dail | |
| 5,930,262 A | 7/1999 | Sierens et al. | |
| 5,946,622 A | 8/1999 | Bojeryd | |
| 5,963,844 A | 10/1999 | Dail | 455/5.1 |
| 5,986,691 A | 11/1999 | Henderson | |
| 6,112,086 A | 8/2000 | Wala | |
| 6,282,683 B1 * | 8/2001 | Dapper et al. | 714/746 |
| 6,356,369 B1 | 3/2002 | Farhan | |

FOREIGN PATENT DOCUMENTS

| | | |
|---|---|---|
| EP | 0 727 883 | 8/1996 |
| WO | WO 96/24989 | 8/1996 |

OTHER PUBLICATIONS

Nakatsugawa et al., 2000, *IEEE*, pp. 617-621, "Software Radio Base and Personal Stations for Cellular/PCS Systems".

1998, Foxcom Wireless Proprietary Information, pp. 1-8, "Litenna In-Building RF Distribution System".

1998, Foxcom Wireless Proprietary Information, pp. 3-11, "Application Note Rfiber-RF Fiberoptic Links for Wireless Applications".

"Broadband Medium Attachment Unit and Broadband Medium Specification, Type 10BROAD36", *ANS/IEEE Std. 802.3*, 177-205, (1996).

"Scientific-Atlanta Announces New Technology To Enable High-Capacity Digital Reverse Path For Interactive Services", http://www.sciatl.com, *Scientific-Atlanta, Inc., Norcross, GA,* 1-2, (Jan. 18, 1999).

Sniezko, O., "Reverse Path for Advanced Series—Architecture and Technology", *NCTA Technical Papers,* AT&T Broadband & Internet Services, 11-19, (1999).

Sniezko, O., et al., "HFC Architecture in the Making", *NCTA Technical Papers,* AT&T Broadband & Internet Services, 20-29, (1999).

"Adaptive Digital Access Protocol: A MAC Protocol for Multiservice Broadband Access Networks," Dail et al, IEEE Communications Magazine, 34(3), 104-112, Mar. 1, 1996.

"Creating a Network for Interactivity", IEEE Spectrum, IEEE Inc., New York, US, vol. 32, No. 4, Apr. 1995, pp. 58-63, XP000506858, ISSN: 0018-9235.

* cited by examiner

US 6,967,966 B1

DIGITAL RETURN PATH FOR HYBRID FIBER/COAX NETWORK

CROSS REFERENCE TO RELATED APPLICATIONS

This application is related to the following commonly assigned, co-pending applications:
U.S. application Ser. No. 09/273,197, entitled "DIGITAL RETURN PATH FOR HYBRID FIBER/COAX NETWORK" and filed on Mar. 19, 1999 (the "044 Application"), and
U.S. application Ser. No. 09/432,558, filed on the same date as the present application and entitled "DIGITAL NODE FOR HYBRID FIBER/COAX NETWORK" (the "120 Application").
The 044 Application and the 120 Application are incorporated by reference.

TECHNICAL FIELD OF THE INVENTION

The present invention relates generally to the field of telecommunications and, in particular, to a digital return path for a hybrid fiber/coax network.

BACKGROUND

Cable networks originally carried programming from a head end to subscribers over a network of coaxial cable. Over time, these networks have changed. Some cable networks now include fiber optic links as part of the network. This variety of cable network is colloquially referred to as a "hybrid fiber/coax" (HFC) network.

A hybrid fiber/coax network typically includes a head end that broadcasts programming over the network to subscribers in a downstream direction. The network includes two main portions. The first portion of the network is optical links that connect the head end with a number of geographically dispersed distribution nodes. These nodes are referred to as "optical distribution nodes" or "ODNs." At the ODNs, signals from the head end that carry the programming are converted from optical signals to electrical signals. The second portion of the network is coaxial links that connect the ODNs with subscriber equipment. The electrical signals are transmitted to the subscriber equipment over the coaxial cable links.

In recent years, the cable industry has experimented with systems that allow for bi-directional communication between subscriber equipment and the head end. This allows for services such as video-on-demand, telephony and Internet traffic to be offered over a cable network. Typically the 5 to 42 MHZ frequency range is reserved for upstream transmission from customers to the head end. Frequencies between 50 MHZ and an upper limit, e.g., 750 MHZ or 850 MHZ, typically carry downstream transmissions.

The design of the reverse path for transporting data over a hybrid fiber/coax network is laced with difficult technical issues. First, many customers must communicate over a common coaxial cable. Interference between customers and noise ingress onto the cable can cause disruptions and errors in this communication. Ingress and other interference is especially a problem at the low frequencies typically prescribed for upstream communications. Transporting simultaneous data transmissions from many customers also introduces complexity into the system design.

In most current systems, the reverse path is implemented with one of a number of different analog modulation schemes, e.g., MCNS, Data Over Cable Service Interface Specification (DOCSIS). These schemes are complicated to implement due to strict timing requirements and complex modulation schemes. Other systems, such as AT&T's mini fiber node (mFNs), introduce other complexities into the return path.

For the reasons stated above, and for other reasons stated below which will become apparent to those skilled in the art upon reading and understanding the present specification, there is a need in the art for an improved return path for a hybrid fiber/coax network.

SUMMARY

The above mentioned problems with telecommunications systems and other problems are addressed by the present invention and will be understood by reading and studying the following specification. A hybrid fiber/coax network is described which includes an optical distribution node that combines CSMA/CD error detection through frequency translation ("frequency turn-around") with data concentration. In another embodiment, a hybrid fiber/coax network is described which includes a digital return path that transmits upstream, digital data from modems to a head end using modulated carriers that reside, at least in part, below the conventional downstream frequency band, e.g., below 42 MHZ. Problems with contention for bandwidth and ingress noise in this frequency spectrum are addressed through a collision detection mechanism that monitors transmissions on the coaxial cable links of the HFC network.

In one embodiment, an optical distribution node for an hybrid fiber/coax network is provided. The optical distribution node includes a laser transmitter coupleable to a fiber optic link that transmits upstream, digital data to a head end of the network. The node also includes a data concentrator coupled to provide the upstream, digital data to the laser. For at least one coaxial cable link of the network coupleable to the optical distribution node, the node also includes a frequency translator that receives the upstream, digital data modulated on a first carrier frequency and retransmits the upstream, digital data to the plurality of modems for collision detection. The node also includes a data interface coupled between the at least one coaxial cable link and the data concentrator that determines whether the upstream data is valid.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
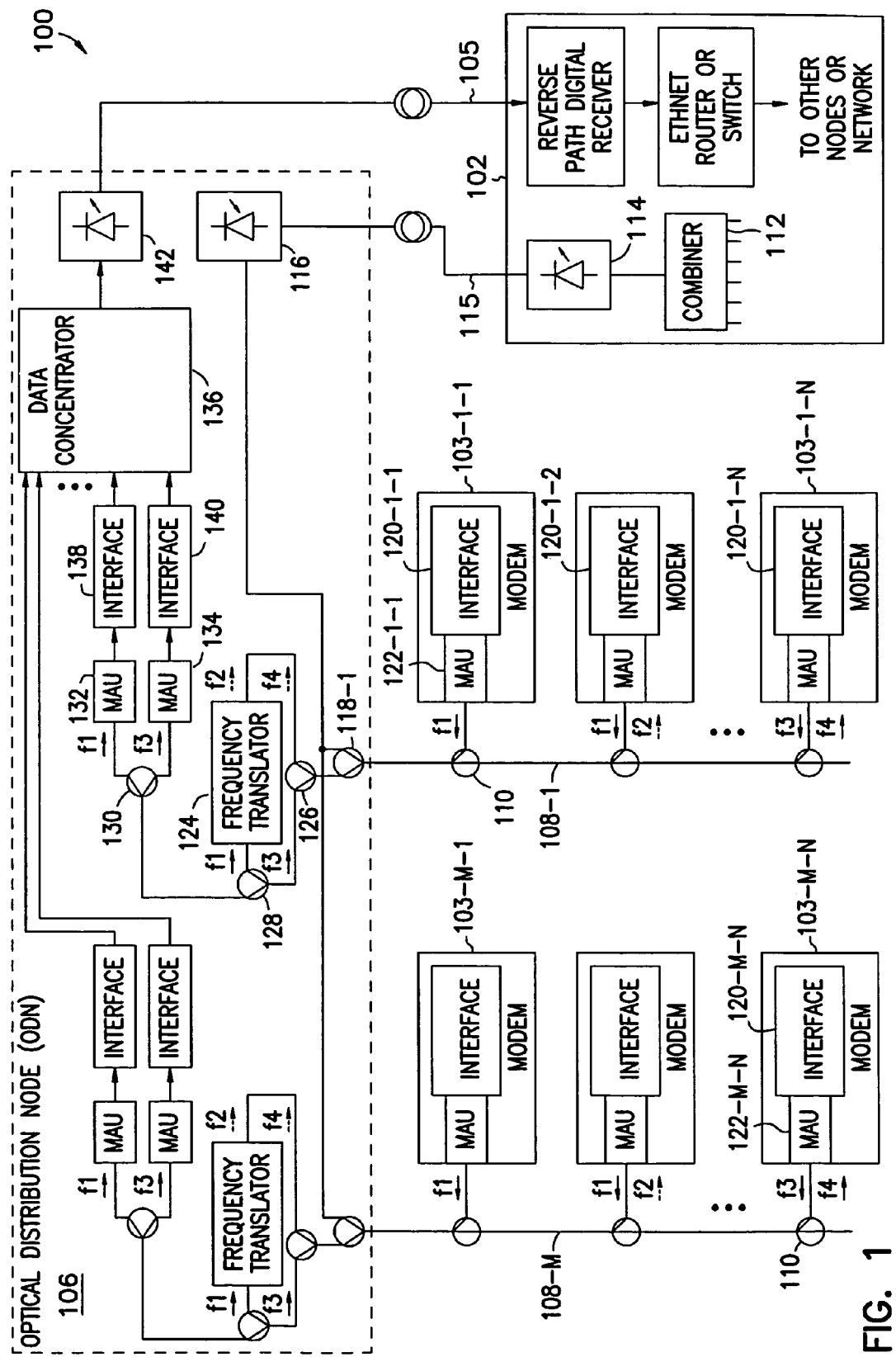
FIG. 1 is a block diagram of an embodiment of a hybrid fiber/coax network constructed according to the teachings of the present invention.

FIG. 1 is a block diagram of an embodiment of a hybrid fiber/coax network, indicated generally at 100, and constructed according to the teachings of the present invention. Network 100 is a bi-directional network that carries signals between head end or hub 102 and a number of modems 103-1-1, . . . , 103-M-N. Advantageously, the return path of network 100 is constructed so as to carry the data in digital format, e.g., as Ethernet or other packets of digital data using Internet Protocol (IP), from modems 103-1-1, . . . , 103-M-N to head end 102, thus providing an all digital return path.

Head end 102 is coupled to modems 103-1-1, . . . , 103-M-N over a combination of fiber optics and coaxial cable. Namely, head end 102 is coupled via fiber optic link 105 with optical distribution node 106. Optical distribution node 106 is also coupled to coaxial cable links or branches 108-1, . . . , 108-M. Modems, represented by modems 103-1-1, . . . , 103-M-N, are selectively coupled to coaxial links 108-1, . . . , 108-M via directional couplers 110.

Network 100 includes downstream and upstream (return) paths each of which is described in turn.

In the downstream path, network 100 combines signals from one or more sources at combiner 112 of head end 102. In one embodiment, combiner 112 receives analog and digital video signals. In another embodiment, combiner 112 also receives other data appropriate for transmission over network 100. Combiner 112 is coupled to optical transmitter 114. Optical transmitter 114 provides optical signals to optical distribution node 106 over fiber optic link 115. These optical signals are received by optical receiver 116 and coupled to coaxial cable links 108-1, . . . , 108-M through diplexers 118-1, . . . , 118-M, respectively.

The downstream data path can use any appropriate data communication protocol, including but not limited to, MCNS and DOCSIS.

In one embodiment, data on fiber optic links 105 and 115 is carried as base-band digital data using on-off keying. In another embodiment, data on fiber optic links 105 and 115 is carried using modulated carriers. Further, data on fiber optic links 105 and 115 is transmitted using the 100BaseT Ethernet protocol or any other standard or custom protocol.

Advantageously, the return path of network 100 carries digital data from modems 103-1-1, . . . , 103-M-N to head end 102. In one embodiment, modems 103-1-1, . . . , 103-M-N transmit Ethernet packets over network 100. In this embodiment, modems 103-1-1, . . . , 103-M-N include standard Ethernet interfaces 120-1-1, . . . , 120-M-N, respectively. It is understood that in other embodiments, an appropriate interface is used based on the format of the data being transmitted over network 100. Interfaces 120-1-1, . . . , 120-M-N are coupled to media access units 122-1-1, . . . , 122-M-N, respectively. Media access units 122-1-1, . . . , 122-M-N provide physical layer interface for modems 103-1-1, . . . , 103-M-N, respectively.

Optical distribution node 106 includes upstream path circuitry for each coaxial cable link 108-1, . . . , 108-M. Due to the similarity between the circuitry for each coaxial cable link, only the upstream path in optical distribution node 106 for coaxial cable link 108-1 is described here. However, it is understood that the remaining coaxial cable links include similar circuitry in optical distribution node 106.

In one embodiment, modems 103-1-1, . . . , 103-1-N launch digital data on coaxial cable link 108-1 by on-off-keying of one of a selected number of radio frequency carriers, designated $f_1$ or $f_3$ in FIG. 1 with digital data in the form of Ethernet packets. In other embodiments other modulation techniques are used, e.g., quadrature phase shift keying (QPSK), quadrature amplitude modulation (QAM), and other appropriate modulation techniques. Each modem 103-1-1, . . . , 103-1-N uses one of the select number of carriers. It is understood that any appropriate number of carriers can be used. In one embodiment, each of the select number of carriers falls in the frequency range below the downstream frequency range, e.g., below 42 MHZ. In other embodiments, one or more of the select number of carriers has a frequency above the downstream frequency range, e.g., above 750 MHZ or 850 MHZ. In another embodiment, one or more of the selected carriers falls within the frequency range which is conventionally reserved for downstream transmissions from the head end. In another embodiment, one or more of the carriers is located on other frequencies that are conventionally used for downstream transmission, e.g., a carrier in the frequency range from 50 to 860 MHZ.

The upstream path of optical distribution node 106 includes frequency translator 124 that is coupled to coaxial cable link 108-1 through couplers 126 and 128. The output of frequency translator 124 is coupled to coupler 126.

Frequency translator 124 provides a loopback mechanism to implement a collision detection protocol for the upstream path of network 100 on coaxial cable link 108-1. Frequency translator 124 translates modulated carriers, e.g., $f_1$ and $f_3$, to other frequencies, e.g., $f_2$ and $f_4$, respectively. Essentially, frequency translator 124 provides aggregate data received from all modems 103-1-1, . . . , 103-1-N on coaxial cable link 108-1 back to modems 103-1-1, . . . , 103-1-N. Each modem 103-1-1, . . . , 103-1-N compares its transmitted data with the aggregate data to determine whether its data was received at optical distribution node 106 without collision with other data or without corruption from ingress noise.

When a modem detects a collision, the modem provides a collision detection signal on another carrier. The modem further waits a randomly selected period of time to attempt retransmission. Advantageously, this process allows network 100 to transmit digital, upstream signals in the conventional upstream band despite ingress and other interference since interference looks like a collision to network 100 and data affected by the interference is automatically retransmitted.

Optical distribution node 106 also includes coupler 130 that provides data to media access units 132 and 134. Each media access unit 132 and 134 is provided to handle data for each modulated carrier used by modems 103-1-1, . . . , 103-M-N on coaxial cable link 108-1. Media access units 132 and 134 are coupled to data concentrator 136 through interface circuits 138 and 140, respectively. Interface circuits 138 and 140 determine whether the data received from coaxial cable link 108-1 is valid data, e.g., interface circuits 138 and 140 determine whether a collision was detected on coaxial cable link 108-1. Data concentrator 136 concentrates data from coaxial cable links 108-1, . . . , 108-M for transmission upstream to head end 102 by laser 142. In one embodiment, laser 142 transmits the upstream, digital data with base-band on-off-keying using 100BASET data format. At head end 102, the data is switched or routed into a data network, e.g., a standard-based or proprietary, private or public network.

In operation, digital data is transmitted from modems 103-1-1, . . . , 103-M-N over network 100 to head end 102. For example, digital data originating at modem 103-1-1 is provided to coaxial cable 108-1 on a modulated carrier. Frequency translator 124 translates the frequency of the modulated carrier and retransmits the data back to modem 103-1-1 with aggregate data from all modems on coaxial link 108-1. Modem 103-1-1 checks for collisions and if any, transmits a collision detect signal on a separate carrier and then waits a random amount of time and retransmits the data.

In the absence of a collision, the data is passed to data concentrator 136 and concentrated with data from other coaxial links. This data is passed to head end 102 over optical fiber link 105 by transmitter 142. At head end 102, the data is routed or switched to other networks.

Figure 2:
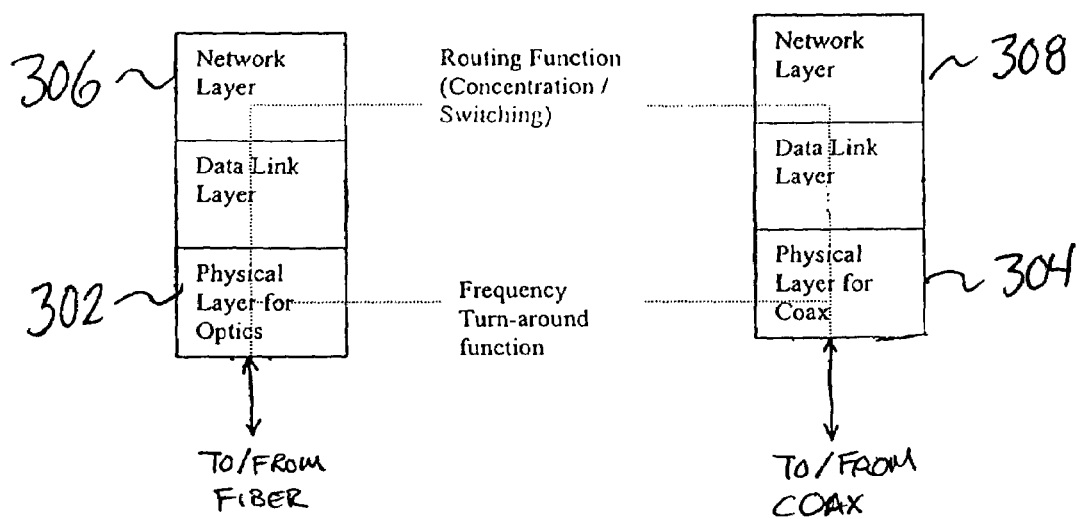
FIG. 2 is a dataflow diagram that illustrates an embodiment of a layered implementation of communication protocol stacks for an optical distribution node according to the teachings of the present invention.

Node 106 of FIG. 1 advantageously combines CSMA/CD error detection through frequency translation ("frequency turn-around") and data concentration. This combination of functionality is shown in FIG. 2. Frequency turn-around is performed at the physical layer as indicated next to blocks 302 and 304. Further, routing functionality, e.g., concentration and switching, is provided at the network layer as indicated by blocks 306 and 308. In this manner, the frequency turn-around scheme does not require modulation or demodulation processes and is kept transparent to the hardware at node 106.

CONCLUSION

A hybrid fiber/coax network has been described with a digital return path. Essentially, digital data is modulated on one or more carriers within the conventional upstream bandwidth by modems and provided to an optical distribution node. A collision detection process is used by looping back aggregate data to the modems on a common coaxial cable link. The data from a number of coaxial cable links are concentrated and transmitted as digital data over a fiber optic connection to a head end or hub.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, data can be transmitted in formats other than standard Ethernet formats. Further, any appropriate number of carrier frequencies can be used to carry digital data to the optical distribution nodes. Also, a part of the upstream data can be transmitted on carriers that are located above 850 MHZ in the frequency spectrum. This allows the upstream data path to carry more data than the conventional upstream band. Further, it is understood that a portion of the upstream path can be carried on the conventional downstream frequencies, e.g., between 42 and 850 MHZ, if the spectrum is not allocated for downstream communication. An optical distribution node can also support as few as one coaxial cable link. Further, modulation formats other than on-off keying can be used, including, but not limited to quadrature phase-shift keying (QPSK) and quadrature amplitude modulation (QAM). In one embodiment, frequency turn-around at node 106 is accomplished according to ANSI/IEEE standard 802.3 (1996) (the "10BROAD36 standard"). Further, it is understood that a frequency translator can be coupled to one or more coaxial cable links.

What is claimed is:

1. A hybrid fiber/coax network, comprising:
    a head end;
    at least one optical distribution node coupled to the head end over at least one fiber optic link;
    at least one coaxial cable link, coupled to the at least one optical distribution node, that receives upstream, digital data from a plurality of modems; and
    wherein the at least one optical distribution node has a digital return path that includes:
        a laser transmitter coupled to the fiber optic link that transmits the upstream, digital data to the head end;
        a data concentrator coupled to provide the upstream, digital data to the laser; and
        for the at least one coaxial cable link,
            a frequency translator that receives and translates the upstream, digital data from the plurality of modems to a different carrier frequency and retransmits the signal to the plurality of modems for collision detection; and
            a data interface coupled between frequency translator and the data concentrator that determines whether a collision occurred with the upstream, digital data so as to prevent corrupted upstream, digital data from being passed on to the head end.

2. The network of claim 1, wherein at least a portion of the upstream, digital data is transmitted over the at least one coaxial cable link on modulated carriers below 42 MHZ.

3. The network of claim 1, wherein the modulated carriers are modulated with the upstream, digital data using one of on-off-keying, quadrature phase-shift keying and quadrature amplitude modulation.

4. The network of claim 1, wherein the upstream, digital data is carried on one of at least two modulated carriers.

5. The network of claim 1, wherein the plurality of modems transmit collision detection signals on a different modulated carrier when a collision is detected based on signals from the frequency translator.

6. The network of claim 1, wherein the upstream, digital data comprises Ethernet packets.

7. The network of claim 2, wherein at least another portion of the upstream, digital data is transmitted over the plurality of coaxial cable links on modulated carriers above a cut-off frequency for downstream transmissions.

8. The network of claim 1, wherein the laser transmitter transmits the upstream, digital data as one of base-band and modulated carrier transmission.

9. The network of claim 1, and further including a receiver circuit coupled to the fiber optic link and the at least one coaxial cable link that receives downstream optical signals and converts the signals to electrical signals for transmission over the at least one coaxial cable link.

10. A hybrid fiber-coax network, comprising:
    a head end;
    at least one optical distribution node coupled to the head end over at least one fiber optic link to provide upstream, digital data to the head end;
    at least one coaxial cable link, coupled to the at least one optical distribution node, that receives the upstream, digital data from a plurality of modems;
    wherein at least a portion of the upstream, digital data is transmitted over the at least one coaxial cable link on at least one modulated carrier below a frequency range for downstream transmission; and
    wherein the at least one optical distribution node includes circuitry for retransmitting upstream, digital data back over the at least one coaxial cable link to detect collisions on the at least one coaxial cable link.

11. The network of claim 10, wherein the modulated carriers are modulated with the upstream, digital data using one of on-off-keying, quadrature phase-shift keying and quadrature amplitude modulation.

12. The network of claim 10, wherein the upstream, digital data is carried on one of at least two modulated carriers.

13. The network of claim 10, wherein the plurality of modems transmit collision detection signals on a different modulated carrier when a collision is detected based on signals from a frequency translator.

14. The network of claim 10, wherein the upstream, digital data comprises Ethernet packets.

15. The network of claim 10, wherein at least another portion of the upstream, digital data is transmitted over the at least one coaxial cable link on modulated carriers above a cut-off frequency for the downstream transmissions.

16. The network of claim 10, wherein the at least one optical distribution node transmits the upstream, digital data as one of base-band and modulated carrier transmission.

17. The network of claim 10, and further including a receiver circuit coupled to the fiber optic link and the at least one coaxial cable link that receives downstream optical signals and converts the signals to electrical signals for transmission over the at least one coaxial cable link.

18. An optical distribution node for an hybrid fiber/coax network, the optical distribution node comprising:
 a laser transmitter coupleable to a fiber optic link that transmits upstream, digital data to a head end of the network;
 a data concentrator coupled to provide the upstream, digital data to the laser; and
 for at least one coaxial cable link of the network coupleable to the optical distribution node,
  a frequency translator that receives the upstream, digital data modulated on a first carrier frequency from a plurality of modems and translates the upstream, digital data to a different carrier and retransmits the upstream, digital data to the plurality of modems for collision detection; and
  a data interface coupled between the at least one coaxial cable link and the data concentrator that determines whether a collision occurred with the upstream data so as to prevent corrupted upstream, digital data from being passed on to the head end.

19. The node of claim 18, and further including at least one media access unit coupled to the at least one coaxial cable link and the data concentrator.

20. The node of claim 18, wherein the upstream, digital data comprises Ethernet packets.

21. The node of claim 18, wherein the laser transmitter transmits the upstream, digital data as one of base-band and modulated carrier transmission.

22. The node of claim 18, wherein the frequency translator also receives upstream, digital data on at least one additional carrier.

23. The node of claim 18, wherein the frequency translator receives the upstream, digital data modulated on a first carrier with a frequency that is below the frequency range for downstream transmissions.

24. A method for processing data in a return path of a hybrid fiber/coax network, the method comprising:
 receiving, on a first coaxial cable, upstream, digital data modulated on a first carrier;
 translating the frequency of the first carrier to a second frequency;
 retransmitting the upstream, digital data modulated on the carrier with the second frequency;
 checking for collision detection signals based on the retransmitted upstream, digital data;
 concentrating the upstream, digital data with upstream, digital data from other coaxial cables; and
 transmitting the concentrated, upstream, digital data to the head end.

25. The method of claim 24, wherein receiving digital data comprises receiving digital data on a first carrier below a frequency range for downstream transmission.

26. The method of claim 24, wherein translating the frequency of the first carrier comprises translating the frequency of the first carrier to a second frequency below the frequency used for downstream transmission.

27. The method of claim 24, wherein checking for collision detection signals comprises monitoring a third frequency for collision detection signals.

28. The method of claim 24, wherein transmitting the concentrated, upstream, digital data comprises transmitting base-band signals as one of base-band and modulated carrier transmission.

29. The method of claim 24, wherein receiving, on a coaxial cable, upstream, digital data comprises receiving Ethernet packets on a modulated carrier.

* * * * *